Figure 2:
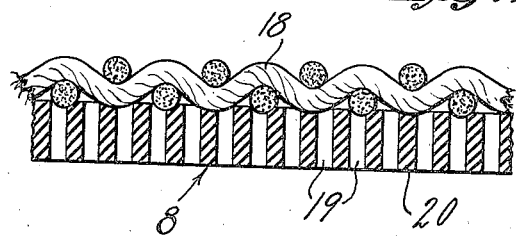

June 4, 1940.  H. C. TINGEY  2,202,932
FILTERING APPARATUS
Filed April 9, 1938

INVENTOR.
HAROLD C. TINGEY
BY Gourley & Budlong
ATTORNEYS

Patented June 4, 1940

2,202,932

UNITED STATES PATENT OFFICE 2,202,932

FILTERING APPARATUS

Harold C. Tingey, Nutley, N. J., assignor, by mesne assignments, to United States Rubber Company, New York, N. Y., a corporation of New Jersey Application April 9, 1938, Serial No. 201,072

2 Claims. (Cl. 210—201)

This invention relates to filtering apparatus and more particularly to apparatus for compacting and washing a mass of filtered material during a filtering process.

A currently practiced continuous filtration process involves the use of a slowly rotating cylinder or drum having a porous filtering medium on its outer surface and means for producing a partial vacuum within the interior of the drum. The drum is horizontally mounted so that the lower portion of its periphery revolves within a tank of a slurry or suspension of the material which is to be recovered by filtration. In one revolution, the drum successively picks up a coating of slurry, sucks a portion of the mother liquor from the suspension thereby forming a loose cake of the material to be recovered, carries the cake past washing and compressing means, and withdraws the washing liquid from the cake; finally the dried cake is removed from the drum immediately before completion of the revolution. A convenient washing and compressing means comprises a porous belt which is held in pressure contact to travel with the filter cake during a portion of its revolution and a cooperating source of washing liquid which wets the belt and permits the liquid to be sucked successively through the belt, the filter cake, and the porous filtering medium of the drum. In the past, fabric belts, such as cotton sheeting, have been employed for washing and compacting the filter cake. When, however, very closely compactable material, such as starch, is washed and compressed by this means, the fibers of the cotton fabric extend into the wet cake, become gripped thereby, and are finally pulled away from the fabric. The belt is consequently soon destroyed and frequent replacement thereof is necessary. The filter cake also becomes contaminated by the presence of the disassociated fibers.

According to the present invention the belting or sheet material employed to compress and wet the filter cake in a process such as that described above, is not subject to deterioration resulting from the destructive action which starch or other filtered material has upon a fibrous belt. The material comprises a cake-engaging surface which is liquid-pervious but non-fibrous, and a backing material of fabric or other porous fibrous consistency. In this laminated belt the compressing surface may comprise perforate rubber sheet material, and the backing or liquid-distributing surface may comprise fabric, such as flannel. Since the cake-engaging surface of this material is not fibrous, the filter cake, whether wet or dry, will have no physical deteriorating effect thereupon such as is encountered with all-fibrous belts. The former necessity for frequent replacement of the belt is thereby avoided since the filter cake engages no fibers to be pulled away. Contamination of the filter cake is also avoided since no loose fibers are caught therein.

Figure 1:
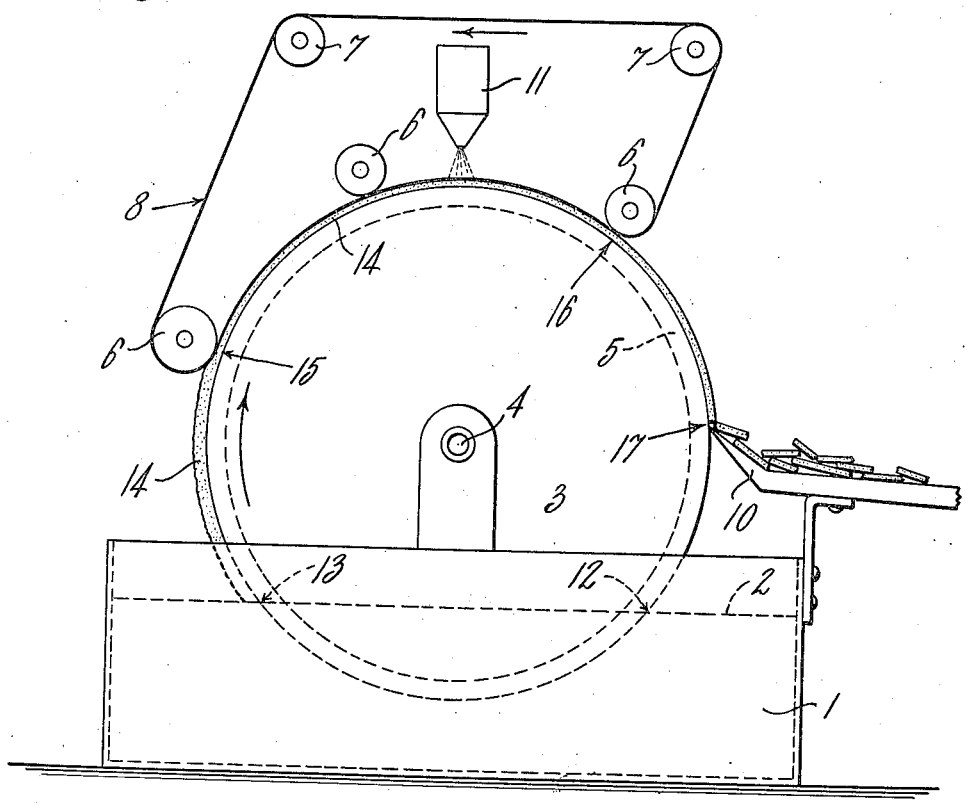

Referring to the drawing, Fig. 1 is a diagrammatic end view of a filtering apparatus embodying the present invention; and Fig. 2 is an enlarged cross-sectional view of a portion of the belt.

Fig. 1 illustrates a starch-filtration apparatus in which the present invention is utilized and which may be operated continuously for extended periods of time without appreciable deterioration of the washing and compressing belt, and without contamination of the filter cake. A tank 1 open at the top contains a water suspension or slurry 2 of material to be filtered, such as starch. A drum 3 revolves about a shaft 4 mounted above the tank 1 so that the lower portion of the drum extends into the starch slurry 2. A filtering medium 5 is provided on the exterior of the drum 3 and pumping means (not shown) are provided to apply a partial vacuum to the interior of the drum. Above the drum a series of rollers 6 and 7 carry a porous continuous washing and compressing member 8, in the form of an endless belt, the rollers 6 being arranged around the periphery of the drum to support the belt closely thereto. Driving means may be provided to drive one or more of the rollers 6 and 7 so that the belt 8 has the same surface speed as the filtering medium 5 of the drum. A blade or knife 10 is supported against the surface of the drum to remove the filtered starch therefrom. A source 11 of washing liquid such as water is provided above the drum and above the portion of the belt which travels with the drum.

In operation, the drum 3 rotates slowly in the direction of the arrow, first picking up by suction some of the starch suspension 2 from the tank 1 between the points 12 and 13. As the vacuum is applied, some of the mother liquor from the material 2 is withdrawn from the starch which assumes the form of a filter cake 14 and is held by differential pressure against the surface of the drum. Between the points 13 and 15 a considerable portion of this liquor is removed so that at the point 15 a comparatively dry cake of uncompressed and unwashed starch is produced. Between the points 15 and 16 the cake is subjected, by cooperation of the member or belt 8 with the liquid source 11, to a washing and compressing step in the process. The compression or compacting is effected by passing the cake between the belt 8 and the surface of the drum within a limited space determined by the position of the rollers 6 with respect to the drum surface. The washing liquid, such as water, flowing from the source 11 falls upon the fabric back 18 of the belt 8 and is distributed thereover between the points 15 and 16 whence it is sucked through the perforations 19 in the face 20 of the belt, which is preferably of rubber (see Fig. 2). Between the point 16 and the knife 10 the residual wash liquid is withdrawn by suction through the filter medium 5 into the interior of the drum whence it may be removed. After the final washing liquid is removed from the cake, the knife or blade 10 scrapes the cake from the surface of the drum 3 as it passes the point 17.

The endless belt or washing and compacting member 8 travels in the direction of the upper arrow in Fig. 1. The belt is wet by the liquid source 11 during its course of travel around the rollers 6, but by the time it passes over the rollers 7, the greater portion of water has been withdrawn from it and it is comparatively dry.

The liquid-pervious material illustrated in Fig. 2 is particularly suitable as a washing and compressing belt for starch filtration due to the fact that no fiber comes into contact with the starch cake to be withdrawn thereby as the cake is compacted. The purpose of the fibrous fabric backing 18 over the rubber ply 20 is to catch and distribute the wash water over the surface of the rubber and prevent its running off the sloping surface of the belt. While the perforate ply 20 may be of any suitable smooth liquid-permeable material, it has been found that the rubber sheet material described in the United States Patent 2,032,941 to Chester E. Linscott and Harold D. Rice is particularly suitable for this purpose because of the fineness and frequency of perforations and the wearing qualities of the solids deposit of the rubber latex composition from which it is made. As described in the aforementioned patent, this rubber sheet material may be conveniently produced by depositing a film of latex onto a deposition backing provided with a multitude of small cavities in its surface, and then concurrently causing air entrapped in the cavities to blow holes through the film and drying or gelling the film. This process is then repeated with successive films of latex until a perforate sheet of the desired thickness has been produced. Although it has been found eminently satisfactory to employ a compacting and washing member 8 such as that above described, it is of course obvious that different sheet material, as well as similar sheet material made in a different manner, may be successfully used. For example, the face ply 20 which compresses the filter cake may be of calendered rubber sheeting or of latex sheeting which has been perforated as by molding prior to vulcanization, or by punching after vulcanization, or by other known methods. The perforate rubber sheet may be conveniently plied to the backing ply 18 of fabric by any suitable means such as by doubling them together with an adhesive. The sheet may then be vulcanized and a firm bond between the fabric and the rubber will thereby be formed. The sheet may be cut to the width of the drum 3 and then spliced to form the endless belt 8.

The backing ply 18 of the washing and compressing member 8 embodying the present invention may be of any suitable material which will become wetted with water and/or permit water to flow through the perforations in the face ply without running over them and off the belt altogether. Fabric, woven or knitted, is suitable for this purpose since it permits the back of the member to become wetted by the washing liquid and at the same time closes up only a negligible portion of the perforations in the face ply so that a thorough washing of the compacted filter cake is insured. Porous aggregations of fibrous material other than fabric, such as loosely felted matting, may also be used to constitute the backing ply, so long as the matting provides a surface which will become wetted upon the application of washing liquid thereupon, and/or so long as it will transmit through its thickness the liquid which it receives on its upper surface.

Any suitable means for laminating the two plies of material together may be employed, so long as the perforations or pores are not substantially impeded. When a cement is applied to the fabric or to the back of the face ply, or to both, it is advisable that it be spread onto the surface in a thin film, and that any excess be removed in order that the pores in the material shall not be obstructed or filled by the cement. Before complete drying of the cement, a jet of air may be applied to blow through the composite material to insure the permanent porosity thereof for the subsequent transmission of the washing liquid through the belt made of the material. Other methods of fabricating the washing and compacting member or belt will occur to those skilled in the art. The washing and compacting member may of course be employed to wash and compact filter cakes of material other than starch.

The term "rubber" as used in this specification and the appended claims includes natural or synthetic rubber or rubber-like materials, and the term "latex" is used to designate broadly coagulable dispersions of elastic materials, including artificial dispersions of rubber or rubber-like materials as well as natural latex, which may be preserved or compounded or otherwise treated as desired, as for example, by vulcanization, and which may be in normal, diluted, concentrated or purified condition produced by methods well known in the art.

While certain present preferred embodiments of the invention have been shown and described, it is to be understood that the invention may be otherwise embodied and practiced within the spirit thereof and the scope of the appended claims.

Having thus described my invention what I claim and desire to protect by Letters Patent is:

1. Filtering apparatus comprising a travelling filter medium for supporting filterable material to be washed and compacted, washing means disposed in the path of travel of the filter medium and adapted to supply washing fluid to filterable material on said filter medium, means for washing and compacting filterable material on said filter medium comprising a porous laminated sheet having a ply of porous fibrous material and a ply of porous non-fibrous material and having successive portions of its surface interposed between said washing means and said filter medium, the ply of fibrous material being nearer said washing means, and said non-fibrous ply being adjacent said filter medium and adapted to contact filterable material on said filter medium, and pressure means associated with said laminated sheet to cause the same to compress filterable material between said non-fibrous ply and said filter medium.

2. Filtering apparatus comprising a travelling filter medium for supporting filterable material to be washed and compacted, washing means disposed in the path of travel of the filter medium and adapted to supply washing fluid to filterable material on said filter medium, means for washing and compacting filterable material on said filter medium comprising a porous laminated sheet having a ply of porous fibrous material and a ply of perforate rubber material and having successive portions of its surface interposed between said washing means and said filter medium, the ply of fibrous material being nearer said washing means, and said rubber ply being adjacent said filter medium and adapted to contact filterable material on said filter medium, and pressure means associated with said laminated sheet to cause the same to compress filterable material between said rubber ply and said filter medium.

HAROLD C. TINGEY.